United States Patent [19]
Kusek et al.

[11] Patent Number: 5,456,299
[45] Date of Patent: Oct. 10, 1995

[54] LOG CUT AND SPLIT MOBILE DEVICE

[76] Inventors: Denis Kusek, Rte. 1, Box 30, Ashton, Nebr. 68817; Allen E. Kusek, 7110 S. Franklin Way, Littleton, Colo. 80122

[21] Appl. No.: 312,231
[22] Filed: Sep. 26, 1994
[51] Int. Cl.[6] ........................................ B27L 7/00
[52] U.S. Cl. .................. 144/3 K; 74/63; 144/193 A; 144/366
[58] Field of Search ................ 74/63; 144/3 K, 144/193 R, 193 A, 366

[56] References Cited

U.S. PATENT DOCUMENTS

| 4,128,117 | 12/1978 | Terry et al. | 144/193 A |
|---|---|---|---|
| 4,164,965 | 8/1979 | Bodant | 144/3 K |
| 4,258,764 | 3/1981 | Gerst | 144/193 R |
| 4,269,242 | 5/1981 | Smith | 144/3 K |
| 4,441,535 | 4/1984 | Flinn et al. | 144/3 K |

Primary Examiner—W. Donald Bray

[57] ABSTRACT

A log cut and split mobile device wherein a support beam having a hitch yoke and a mobile axle having wheel members is arranged to include a support frame secured to the support frame, such that the support frame is provided with a saw blade rotatably mounted thereto in operative communication to a drive motor through a drive belt in selective operative communication to drive the saw blade by means of the drive motor, with a hydraulic pump operative through a valve member to effect selective reciprocation of a ram relative to the support beam to permit splitting of a log oriented between the ram and a splitting wedge.

4 Claims, 4 Drawing Sheets

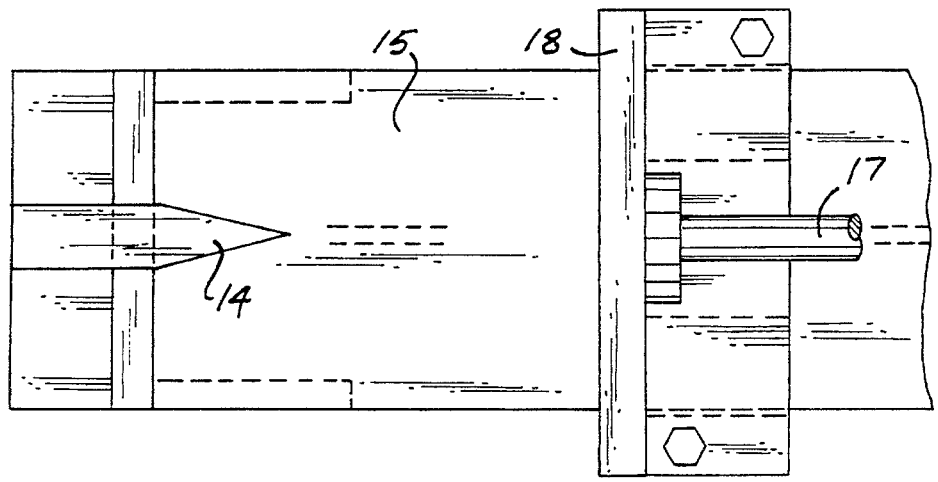
FIG. 4
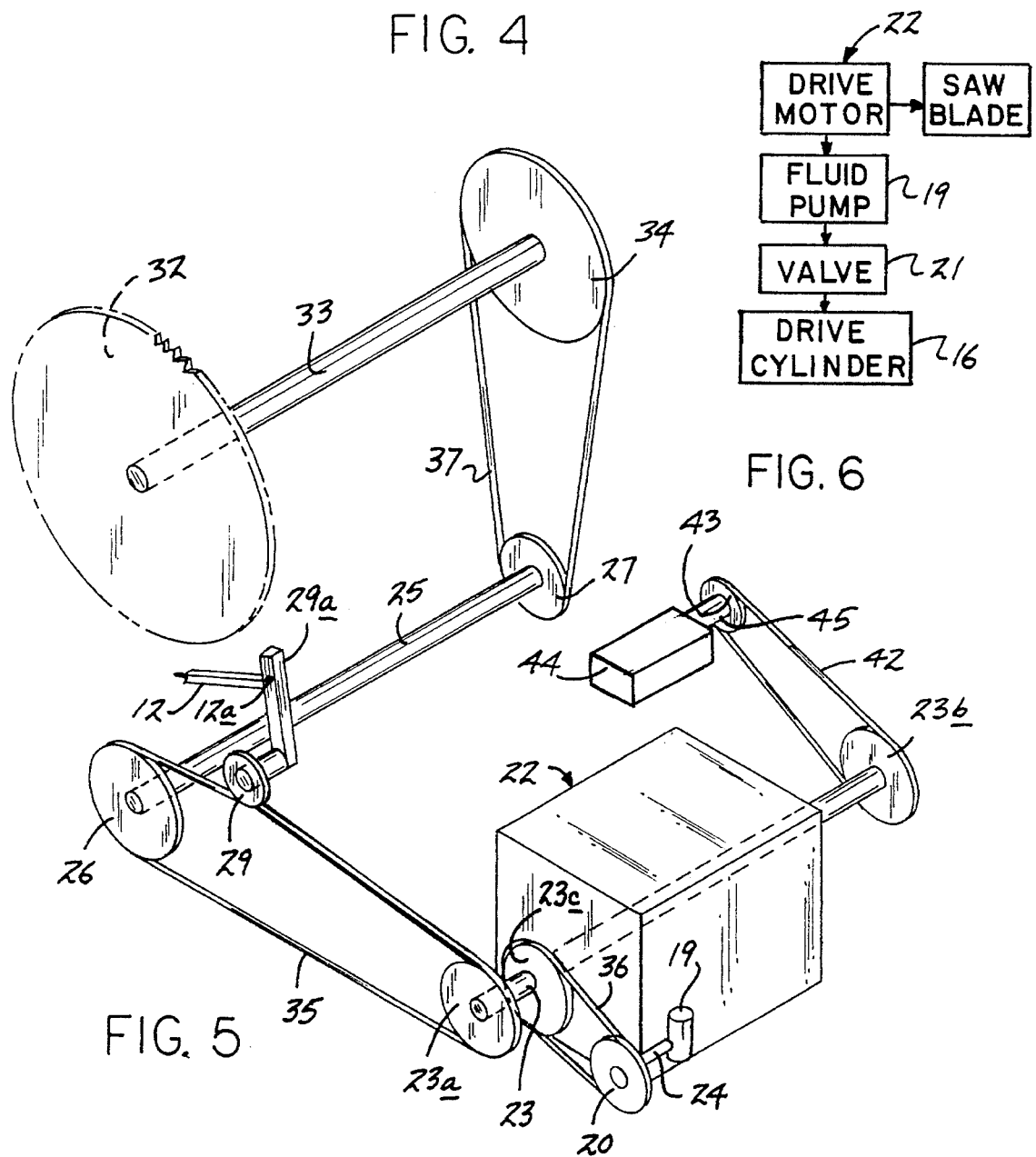
FIG. 5
FIG. 6

LOG CUT AND SPLIT MOBILE DEVICE

TECHNICAL FIELD

The field of invention relates to log cut and split structure, and more specifically pertains to a new and improved log cut and split mobile device wherein the same is arranged for the severing and splitting of logs mounted to a mobile frame assembly.

BACKGROUND OF THE INVENTION

Mobile log cutting and splitting structure is indicated in U.S. Pat. No. 4,441,535 employing a cut and split structure. Such is also exemplified in the U.S. Pat. No. 4,269,242 and U.S. Pat. No. 4,258,764.

The instant invention attempts to overcome deficiencies of the prior art by providing for a log cutting and splitting structure of enhanced compactness and ease of use relative to existing mobile structure such as also indicated in U.S. Pat. No. 4,164,965, wherein the instant invention permits the ease of actuation of the cutting and splitting structure in a manner not available in the prior art.

SUMMARY OF THE INVENTION

The present invention relates to a support frame mounting a rotary saw blade provided with an associated hydraulic pump and a log splitting hydraulic cylinder arranged for ease of operative movement relative to a drive motor.

Objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 4 is an orthographic enlarged view of the plate and splitting wedge employed by the invention.

FIG. 5 is an isometric illustration of the drive pulley structure of the invention.

FIG. 6 is a diagrammatic flow illustration of the cooperation of the drive motor relative to the sub-systems of the invention.

DESCRIPTION OF THE PREFERRED EMBODIMENT

As required, detailed embodiments of the present invention are disclosed herein; however, it is to be understood that the disclosed embodiments are merely exemplary of the invention, which may be embodied in various forms, therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
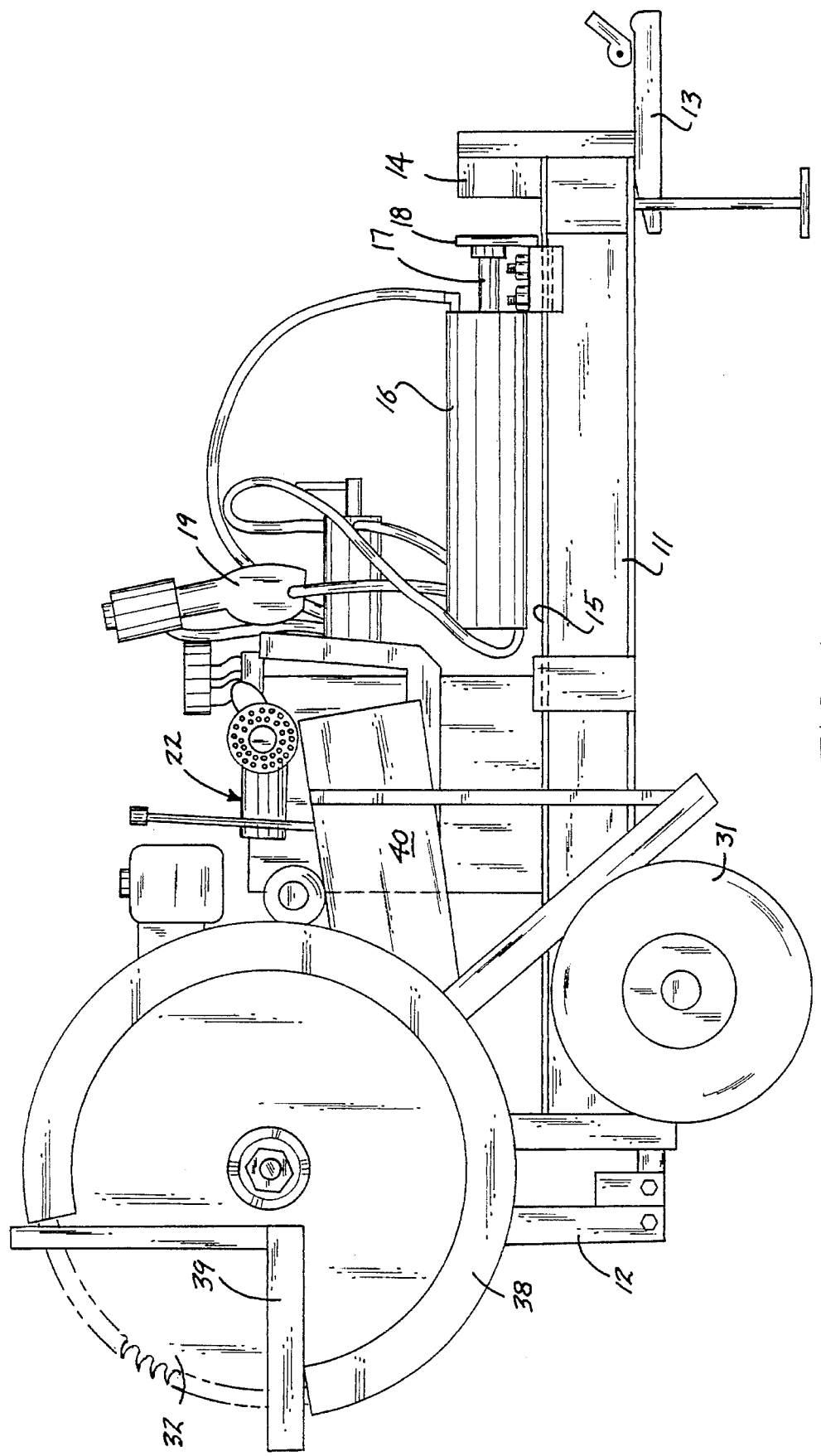
FIG. 1 is an orthographic right side view of the invention.
Figure 2:
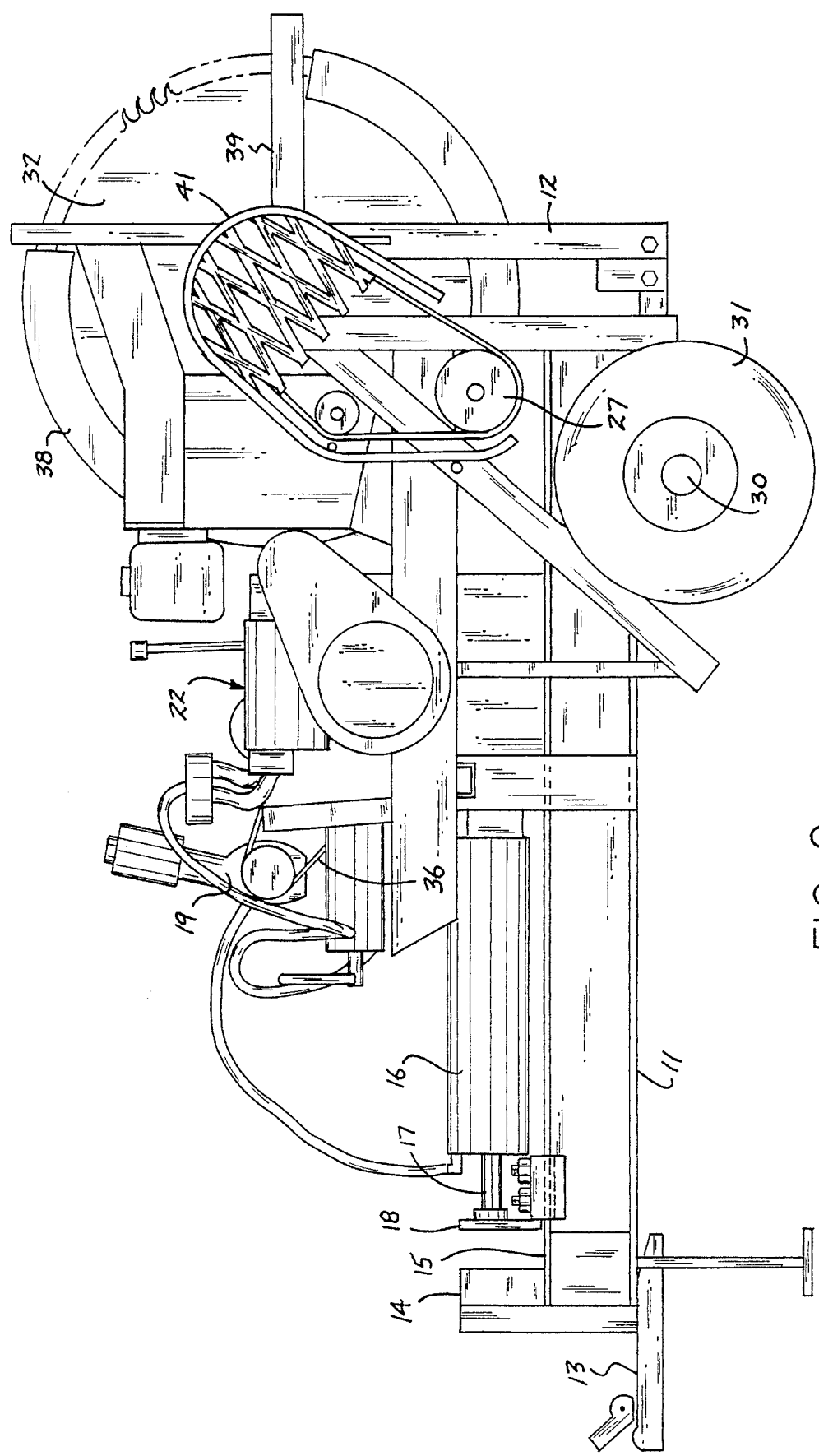
FIG. 2 is an orthographic left side view of the invention.
Figure 3:
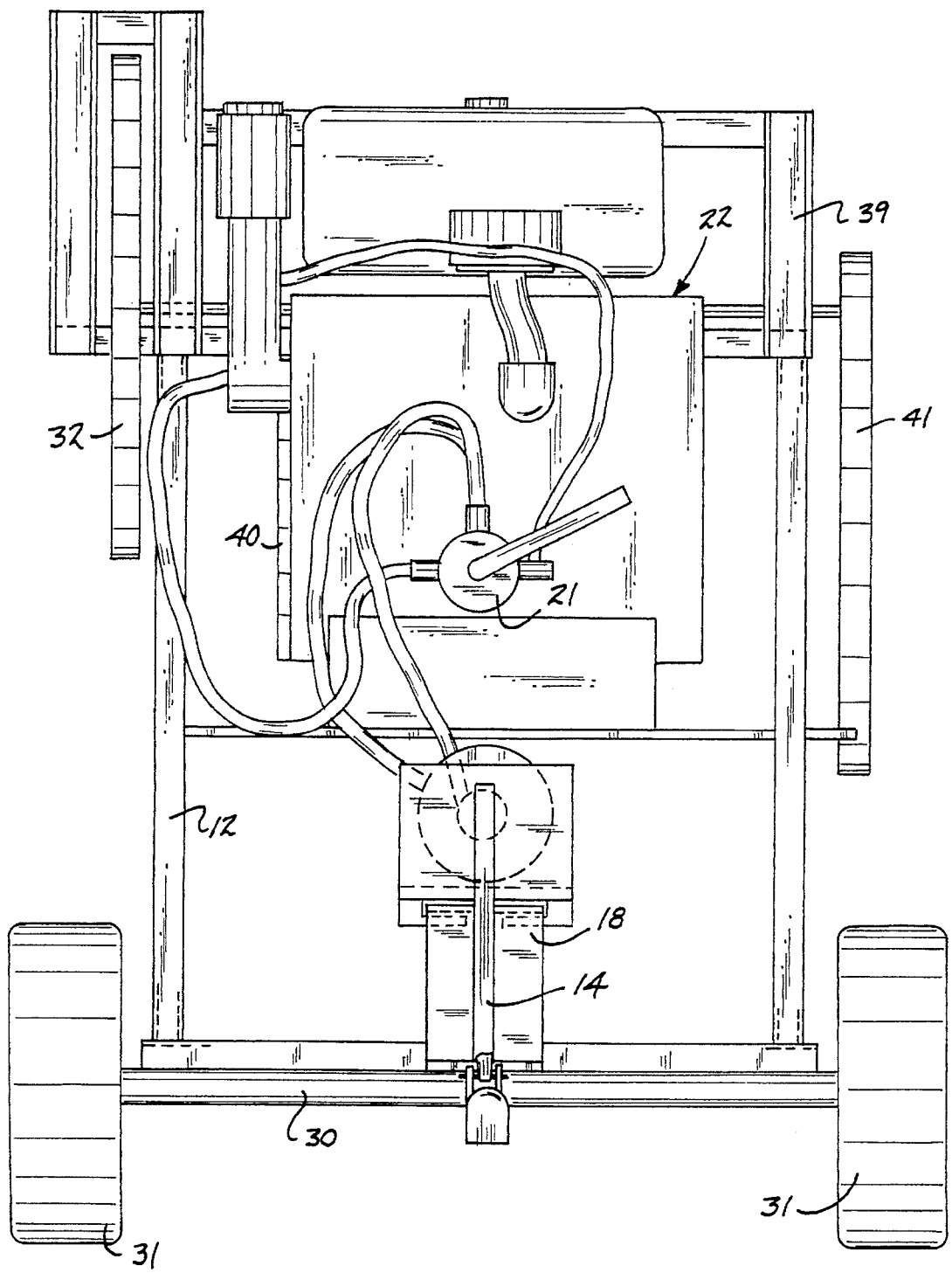
FIG. 3 is an orthographic frontal view of the invention.

The log cut and split mobile device 10 of the invention as indicated in FIGS. 1–3 for example employs an elongate support beam 11 mounting a support frame 12, with a hitch member 13 secured to a forward distal end of the support beam 11 for securement to an associated transport vehicle (not shown). The support beam also has mounted thereto a mobile axle 30 in a substantially orthogonal relationship, such that the mobile axle 30 employs rotatably mounted wheel members 31 at each end of the mobile axle 30 for ease of transport of the device to various sites for a cutting and splitting procedure. To this end, a splitting wedge 14 is fixedly mounted in an orthogonal relationship relative to the support beam top wall 15, with the splitting wedge 14 extending in a facing relationship relative to a ram plate 18 of an associated ram 17, that in turn is reciprocatably mounted relative to a hydraulic cylinder 16. The hydraulic cylinder 16, the ram 17, and the plate are longitudinally aligned relative to and in a facing relationship the splitting wedge 14 to permit positioning of a log member (not shown) between the ram plate 18 and the splitting wedge 14.

A fluid pump 19 is positioned spaced from the hydraulic cylinder 16, with the fluid pump 19 in fluid communication with the hydraulic cylinder 16 through a four-way valve permitting projection and reversal of the ram 17 relative to the splitting wedge 14, in a manner as exemplified in U.S. Pat. No. 4,441,535 incorporated herein by reference. The frame 12 further mounts a drive motor 22 having a motor output shaft 23 coupled to the pump shaft 24, such that a drive first pulley 23a and a drive second pulley 23b are mounted on opposed ends of the output shaft 23 in the drive first pulley 23a and a drive third pulley 23c are each fixedly secured to the motor output shaft 23. A fluid pump drive pulley 20 is in operative drive communication with the fluid pump 19 through a pump shaft 24 securing the fluid pump drive pulley 20 thereto. The drive third pulley 23c is arranged to drive the fluid pump drive pulley 20 through the use of a second drive belt 36, as illustrated in FIG. 5. A driven shaft 25 is spaced from the pump shaft 24, such that the driven shaft 25, the pump shaft 24, and the drive shaft 23 are arranged in a parallel relationship relative to one another. Driven shaft first and second pulleys 26 and 27 are mounted to opposed ends of the driven shaft 25. A first drive belt 35 extends about the drive first pulley 23a and the driven shaft first pulley 26, with idler pulley 28 arranged for engagement with the first drive belt 35. The second idler pulley 29 is pivotally mounted about a pivot axle 12a that in turn is secured to a yoke 29a, that in turn is pivotally mounted to the frame 12 permitting simultaneous engagement of the pulleys 23a and 26 in a simultaneous relationship. The use of the second drive belt 36 to the fluid pump second drive pulley 20 is provided to provide for driving of the fluid pump 19 at all times pressurizing the pump permitting continuous utilization of the hydraulic cylinder 16. The driven shaft 25 is arranged to drive a third drive belt 37 that in turn drives a saw blade pulley 34, and in turn secured to a saw blade shaft 33 arranged to effect rotation selectively of the saw blade 32 upon pivoting of the second idler plate 29 into operative engagement, as illustrated in FIG. 5. A fourth drive belt 42 is directed about the drive second pulley 23b and a starter motor output pulley 43 that in turn is driven by a starter motor 44 through starter shaft 45 to permit ease of actuation of the drive motor 22.

Further, a first shield 40 extends over the first drive belt 35, with a second shield 41 extending over the third drive belt 37 as illustrated in the respective FIGS. 1 and 2.

It should be noted that the use of leaf springs for the axle 30 may be optionally employed, with the log split cylinder typically formed dimensionally of a four inch diameter of two feet in length. The drive motor is typically of an eight horse power through sixteen horse power configuration. Various sized tubing and channel are employed arranged to provide for the power output and cooperative relationship with the various subcomponents of the invention to drive for example a saw blade of a twenty-eight to thirty inch diameter.

It is understood that drive chains and sprockets may be employed by the invention in lieu of the drive belts and pulleys as desired.

It is to be understood that while certain forms of the present invention have been illustrated and described herein, it is not to be limited to the specific forms or arrangement of parts described and shown.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed and desired to be protected by LETTERS PATENT of the United States is as follows:

1. A log cut and split mobile device, comprising, an elongate support beam, the support beam having a top wall spaced from a support beam bottom wall, with a support frame secured to the support beam extending beyond the top wall, with a hitch member secured at a forward distal end of the support beam adjacent to the support beam bottom wall, a splitting wedge mounted to the top wall, and the support frame having a rotary saw blade rotatably secured relative to the support frame, and a drive motor, the drive motor having a motor output shaft, the motor output shaft including a drive first pulley and a drive second pulley and a drive third pulley mounted to the motor output shaft, and a fluid pump having a pump shaft oriented parallel to the motor output shaft, with the pump shaft having a pump drive pulley, and a driven shaft spaced from and parallel to the pump shaft, with the driven shaft including a driven shaft first pulley spaced from a driven shaft second pulley, and a saw blade shaft oriented parallel to the driven shaft, with the saw blade shaft including the saw blade shaft fixedly mounted to a first end of the saw blade shaft, and a saw blade shaft pulley mounted to a second distal end of the saw blade shaft, and a mobile axle secured to the support frame, and the mobile axle having wheel members mounted thereto to permit mobile displacement of the support beam and the support frame, and a fluid pump operatively mounted relative to the support frame, and a valve member, and a hydraulic cylinder in fluid communication with the fluid pump through the valve member, and the hydraulic cylinder having a ram reciprocatably mounted to the hydraulic cylinder, and a ram plate orthogonally and fixedly secured to the ram, with the ram plate in a facing relationship relative to the splitting wedge, and drive means arranged to effect selective rotation of the saw blade.

2. A log cut and split mobile device as set forth in claim 1 including at least one idle pulley, the idle pulley rotatably mounted relative to an L-shaped yoke, and the L-shaped yoke having a pivot axle, with the pivot axle pivotally mounting the yoke to the support frame, with the drive means including a first drive belt directed about the drive first pulley, the pump first drive pulley, the driven shaft first pulley, with the idler pulley arranged for selective communication with the first drive belt to effect tensioning of the first drive belt to permit rotation of the driven shaft.

3. A log cut and split mobile device as set forth in claim 2 wherein a second drive belt is directed about the drive third pulley and the pump drive pulley, and a third drive belt directed about the driven shaft second pulley and the saw blade shaft pulley, whereupon communication of the idler pulley with the first drive belt effects rotation of the driven shaft and the saw blade.

4. A log cut and split mobile device as set forth in claim 3 including a starter motor having a starter motor pulley, a fourth drive belt in operative communication with the drive second pulley and the starter motor pulley.

* * * * *